(12) United States Patent
Watfa et al.

(10) Patent No.: US 12,238,181 B2
(45) Date of Patent: Feb. 25, 2025

(54) METHODS FOR HANDLING CIoT DATA FOR INVALID PDU SESSION ID

(71) Applicant: SAMSUNG ELECTRONICS CO., LTD., Suwon-si (KR)

(72) Inventors: Mahmoud Watfa, Staines (GB); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/477,394

(22) Filed: Sep. 28, 2023

(65) Prior Publication Data

US 2024/0114074 A1    Apr. 4, 2024

(30) Foreign Application Priority Data

Sep. 29, 2022  (IN) .............................. 202231055987
Oct. 13, 2022  (IN) .............................. 202231058522
Sep. 25, 2023  (GB) ..................................... 2314696

(51) Int. Cl.
*H04L 67/146*    (2022.01)
*H04L 67/142*    (2022.01)
*H04W 8/20*      (2009.01)

(52) U.S. Cl.
CPC .......... *H04L 67/146* (2013.01); *H04L 67/142* (2013.01); *H04W 8/20* (2013.01)

(58) Field of Classification Search
None
See application file for complete search history.

(56) References Cited

U.S. PATENT DOCUMENTS

| 11,729,699 B2 * | 8/2023 | Bertz ...................... H04W 4/12 370/329 |
| 2017/0033960 A1 * | 2/2017 | Choi ...................... H04L 5/0044 |

(Continued)

FOREIGN PATENT DOCUMENTS

| EP | 3637683 A1 | 4/2020 | |
| KR | 20230079438 A * | 9/2021 | ............ H04W 76/18 |

(Continued)

OTHER PUBLICATIONS

International Search Report and Written Opinion of the International Searching Authority dated Jan. 17, 2024, in connection with International Application No. PCT/KR2023/015093, 6 pages.

*Primary Examiner* — Phyllis A Book

(57) ABSTRACT

The disclosure relates to a 5G or 6G communication system for supporting a higher data transmission rate. Disclosed is a method of operating a user equipment (UE) operable to communicate with a telecommunication network, comprising the steps of: the UE sending to the telecommunication network a control plane service request (CPSR) message with cellular Internet of Things (CIoT) user data, associated with a protocol data unit (PDU) session; the UE receiving from the telecommunication network a SERVICE ACCEPT message, indicating that the PDU session is inactive in the network; and the UE verifying if the PDU session has an identity the same as an identity of the PDU session included in the CPSR message with CIoT user data and, if so then the UE determines that the CIoT user data was not successfully sent to the telecommunication network or to a final recipient.

10 Claims, 4 Drawing Sheets

(56) References Cited

U.S. PATENT DOCUMENTS

| | | | |
|---|---|---|---|
| 2019/0261453 A1* | 8/2019 | Jain | H04W 8/183 |
| 2019/0313468 A1* | 10/2019 | Talebi Fard | H04W 60/04 |
| 2020/0196186 A1* | 6/2020 | Gupta | H04W 28/0289 |
| 2020/0221527 A1* | 7/2020 | Bharatia | H04W 76/22 |
| 2020/0245404 A1 | 7/2020 | Suh et al. | |
| 2020/0323020 A1 | 10/2020 | Liu | |
| 2021/0084121 A1* | 3/2021 | Park | H04L 69/04 |
| 2021/0385625 A1* | 12/2021 | Qiao | H04W 64/00 |
| 2022/0022278 A1* | 1/2022 | Liu | H04L 69/322 |
| 2022/0338084 A1* | 10/2022 | Ryu | H04W 36/142 |

FOREIGN PATENT DOCUMENTS

| | | | | |
|---|---|---|---|---|
| WO | WO-2020154736 A1 * | 7/2020 | | H04W 4/70 |
| WO | 2021021423 A1 | 2/2021 | | |
| WO | 2021206295 A1 | 10/2021 | | |

* cited by examiner

METHODS FOR HANDLING CIoT DATA FOR INVALID PDU SESSION ID

CROSS-REFERENCE TO RELATED APPLICATIONS

This application is based on and claims priority under 35 U.S.C. § 119 to Indian Patent Application No. 202231055987 filed on Sep. 29, 2022, Indian Patent Application No. 202231058522 filed on Oct. 13, 2022, and United Kingdom Patent Application No. 2314696.2 filed on Sep. 25, 2023, the disclosure of which is incorporated by reference herein in its entirety.

BACKGROUND

1. Field

The present disclosure relates to cellular Internet of Things (CIoT) data handling in a telecommunication system when there is no routing context in the access and mobility management function (AMF).

2. Description of Related Art 5G mobile communication technologies define broad frequency bands such that high transmission rates and new services are possible and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an embodiment of the present disclosure, a method of operating a user equipment (UE), operable to communicate with a telecommunication network (e.g., network entity) is provided. The method may include the steps of: the UE sending to the telecommunication network a control plane service request (CPSR) message with cellular Internet of Things, CIoT, user data, associated with a protocol data unit (PDU) session; the UE receiving from the telecommunication network a SERVICE ACCEPT message, indicating that the PDU session is inactive in the network; and the UE verifying if the PDU session has an identity the same as an identity of the PDU session included in the CPSR message with CIoT user data and, if so then the UE determines that the CIoT user data was not successfully sent to the telecommunication network or to a final recipient.

According to an embodiment of the present disclosure, method and apparatus for cellular Internet of Things (CIoT) data handling in a telecommunication system is provided.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
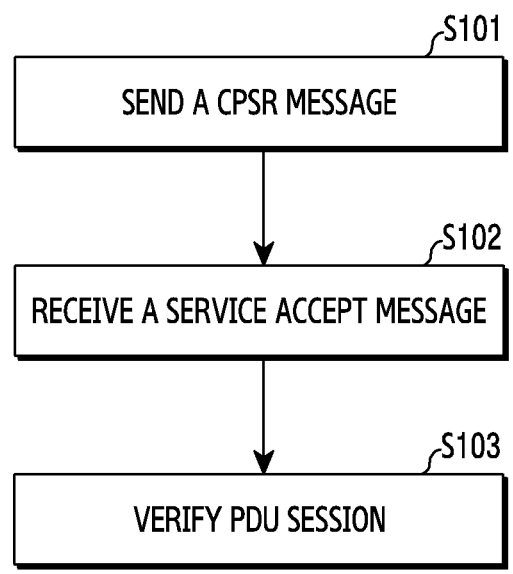
FIG. 1 illustrates a flowchart of a UE method for CIoT data handling according to an embodiment of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to the present disclosure there is provided an apparatus and method as set forth in the appended claims. Other features of the disclosure will be apparent from the dependent claims, and the description which follows.

According to an embodiment of the present disclosure, a method of operating a UE operable to communicate with a telecommunication network is provided. The method may include the steps of: the UE sending to the telecommunication network a CPSR message with CIoT user data associated with a PDU session; the UE receiving from the telecommunication network a SERVICE ACCEPT message, indicating that the PDU session is inactive in the network; and the UE verifying if the PDU session has an identity the same as an identity of the PDU session included in the CPSR message with CIoT user data and, if so then the UE determines that the CIoT user data was not successfully sent to the telecommunication network or to a final recipient.

In an embodiment, the SERVICE ACCEPT message may include a PDU session status Information Element, IE, which indicates that the PDU session corresponding to the PDU session ID, received in the CPSR message, is inactive.

According to an embodiment of the present disclosure, a method of operating a telecommunication network, operable to communicate with a UE is provided. The method includes the steps of: the telecommunication network receiving from the UE a CPSR message with CIoT user data associated with a PDU session; the telecommunication network discarding the CIoT data if the PDU session is deemed to be inactive by the telecommunication network; and the telecommunication network sending to the UE a SERVICE ACCEPT message, indicating that the PDU session is inactive in the network.

In an embodiment, an AMF is operable in the telecommunication network to receive the CPSR message and to send the SERVICE ACCEPT message.

In an embodiment, the SERVICE ACCEPT message includes a PDU session status Information Element, IE, which indicates that the PDU session corresponding to the PDU session ID, received in the CPSR message, is inactive.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The fifth generation system (5GS) (and Evolved Packet System, EPS) allows CIoT devices or User Equipments, UE, to send data over the control plane (CP). For example, the UE in idle mode uses the CPSR message to send data over non access stratum (NAS) i.e., over the control plane. The service request procedure, in this case associated with the transmission of the CPSR message, is completed by the AMF sending a service accept message.

When sending the CPSR message for CIoT data, the UE includes the PDU session identity (ID) which identifies the session for which the data is being sent. This enables the AMF to identify which session management function (SMF) the data may be forwarded to.

In some cases, although the UE may have a PDU session ID and context locally (in the UE), the network may have released a PDU session, but this may not have been communicated yet to the UE e.g., because the UE is in idle mode. As such, the UE which does not know this event may attempt to send data towards an identified PDU session which ultimately does not exist in the network. 3GPP TS 24.501 identifies such a scenario and specifies the following handling at the network side:

g) CONTROL PLANE SERVICE REQUEST message received with the Data type field indicates "control plane user data" in the CIoT small data container IE or received with Payload container type IE set to "CIoT user data container" and:
1) the AMF does not have a PDU session routing context for the PDU session ID and the UE; or
2) the AMF unsuccessfully attempted to forward the user data container and the PDU session ID,
then the AMF may send back to the UE the CIoT user data container or control plane user data which was not forwarded as specified in subclause 5.4.5.3.1 case 11) or case 12).

From the above, it can be seen that the network, in the case of the identified scenario as described in bullet section 1) of the quoted text, may send back to the UE the data which was not forwarded. However, the network uses the DL NAS TRANSPORT procedure to do so i.e., the network sends the DL NAS TRANSPORT message to send back to the UE the data which was not forwarded. The following describes the AMF behaviour for case 11 which is referenced above:

For case 11) in subclause 5.4.5.3.1, i.e., upon sending a single uplink CIoT user data container or control plane user data which was not forwarded due to routing failure, the AMF may:
a) include the PDU session ID in the PDU session ID IE;
b) set the Payload container type IE to "CIoT user data container";
c) set the Payload container IE to the CIoT user data container or control plane user data which was not forwarded; and
d) set the 5GMM cause IE to the 5GMM cause #90 "payload was not forwarded."

NOTE 4: For case 11) in subclause 5.4.5.3.1, this is also applied for a single uplink CIoT user data container or control plane user data in the CONTROL PLANE SERVICE REQUEST message which was not forwarded due to routing failure."

To summarize, the following observations can be made:
The UE may send a CPSR message containing CIoT user data for a PDU session for which there is no routing context; and The network may send the data back to the UE using the DL NAS TRANSPORT message and include the 5GMM cause #90.

The following relates to mobile management entity (MME) handling of EPS session management (ESM) messages for an EPS bearer identity that is not active.

In EPS, it is possible that the UE sends an NAS ESM message for which there is no valid EPS bearer identity. In this case, the MME rejects the NAS ESM message and indicates that the EPS bearer identity is not valid.

For example, 3GPP TS 24.301 specifies the following behaviour for the MME when such a scenario occurs during the bearer resource modification procedure that is initiated by the UE:

a) Unknown EPS bearer context:
If the EPS bearer identity provided in the EPS bearer identity for packet filter IE in the BEARER RESOURCE MODIFICATION REQUEST message indicates an EPS bearer identity value and this does not belong to any already activated EPS bearer context, the MME may reply with a BEARER RESOURCE MODIFICATION REJECT message with ESM cause #43 "invalid EPS bearer identity."

As can be seen, it is already a possibility that an ESM message is sent for which the EPS bearer identity is deemed to be invalid. In this case the network rejects the message as shown above.

A problem experienced with the prior art described above is that the UE can erroneously conclude that CIoT data has been successfully transmitted when it may not have been.

To describe the problem, it is useful to consider the following scenario:
The UE sends a CPSR message containing CIoT user data;
The AMF does not have any routing context for the associated PDU session ID;
The AMF does not send the CIoT user data back to the UE (since this step is optional);
The AMF sends the service accept message (which is needed to complete the service request procedure) which does not contain any indication of a failure to route the CIoT user data;
The UE concludes that the CIoT user data has been successfully transferred since no indication whatsoever was received about the failure. The NAS layer in the UE may inform the upper layers (e.g., an application or the 5GSM entity) that the data has been successfully sent;
The upper layers may discard the CIoT user data content since no indication of a failed transmission was received. Hence, this prohibits the UE from resending the data which may actually carry crucial information for the application server; and/or
The above may repeat over and over and, as such, the UE may end up assuming that CIoT data was successfully sent while this is not the case.

The same problem can also occur in the following scenario:
The UE sends a CPSR message containing CIoT user data;
The AMF does not have any routing context for the associated PDU session ID;
The AMF completes the service request procedure by sending a service accept message; and/or
The AMF sends the CIoT user data back to the UE using the DL NAS TRANSPORT message.

For the latter scenario, the reception—by the UE—of the service accept message before the DL NAS TRANSPORT message may lead to the UE concluding that the CIoT user data was successfully sent. This is because the service accept message currently has no indication of a failure and when received by the UE, it can lead the UE to conclude that the service request procedure for the transmission of CIoT user data was indeed successful. Afterwards, the reception of the DL NAS TRANSPORT message containing data which was actually not forwarded by the AMF may be quite late. For example, the reception of the service accept by the UE may already have triggered an indication of a successful transfer of data to the upper layers which may actually have discarded the content as a result. Then the subsequent reception of the, rather late, DL NAS TRANSPORT message with the indication of an unsuccessful data forwarding by the AMF may not be of much use since the UE has already informed the upper layers of the success. This indication now seems to be contradictory.

The scenarios set out above therefore lead to cases in which the UE assumes a successful CIoT user data transfer whereas the reality is that this cannot be concluded. This leads to problems for the application layer which "thinks" that data has been successfully transported by the NAS layer whereas the data was actually not delivered and in fact no notice was received, or a contradictory status indication is received.

A further issue is the lack of handling by the MME of CIoT user data for which there is an invalid EPS bearer identity. If the UE (in S1 mode i.e., in EPS or in LTE) sends CIoT user data in the ESM DATA TRANSPORT message which contains an EPS bearer identity that is invalid, then the MME behaviour is not known since no handling is defined in 3GPP TS 24.301. As such, the UE does not get any indication about this and may therefore assume that the CIoT user data has been successfully transmitted.

It is therefore an aim of embodiments of the present disclosure to address these and other shortcomings in the prior art, whether mentioned herein or not.

According to the present disclosure there is provided an apparatus and method as set forth in the appended claims. Other features of the disclosure will be apparent from the dependent claims, and the description which follows.

According to a first aspect of the present disclosure, there is provided a method of operating a User Equipment, UE, operable to communicate with a telecommunication network, comprising the steps of: the UE sending to the telecommunication network a CPSR message with cellular Internet of Things (CIoT) user data, associated with a PDU session; the UE receiving from the telecommunication network a SERVICE ACCEPT message, indicating that the PDU session is inactive in the network; and the UE verifying if the PDU session has an identity the same as an identity of the PDU session included in the CPSR message with CIoT user data and, if so then the UE determines that the CIoT user data was not successfully sent to the telecommunication network or to a final recipient.

In an embodiment, the SERVICE ACCEPT message includes a PDU session status information element (IE), which indicates that the PDU session corresponding to the PDU session ID, received in the CPSR message, is inactive.

According to a second aspect of the present disclosure, there is provided A UE arranged to perform the method of the first aspect.

According to a third aspect of the present disclosure, there is provided a method of operating a telecommunication network, operable to communicate with a UE, comprising the steps of: the telecommunication network receiving from the UE a CPSR message with CIoT user data, associated with a PDU session; the telecommunication network discarding the CIoT data if the PDU session is deemed to be inactive by the telecommunication network; and the telecommunication network sending to the UE a SERVICE ACCEPT message, indicating that the PDU session is inactive in the network.

In an embodiment, an AMF is operable in the telecommunication network to receive the CPSR message and to send the SERVICE ACCEPT message.

In an embodiment, the SERVICE ACCEPT message includes a PDU session status IE, which indicates that the PDU session corresponding to the PDU session ID, received in the CPSR message, is inactive.

According to a fourth aspect of the present disclosure, there is provided a telecommunication network arranged to perform the method of the third aspect.

According to a fifth aspect of the present disclosure, there is provided a telecommunication system comprising the UE of the second aspect and the telecommunication network of the fourth aspect.

Although a few preferred embodiments of the present disclosure have been shown and described, it will be appreciated by those skilled in the art that various changes and modifications might be made without departing from the scope of the disclosure, as defined in the appended claims.

Figure 2:
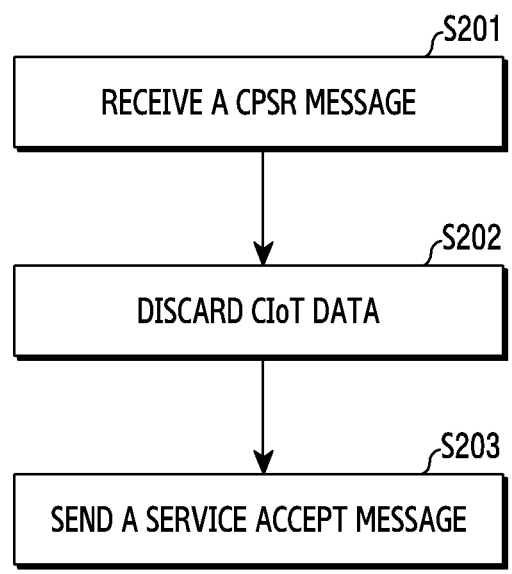
FIG. 2 illustrates a flowchart of a network entity method for CIoT data handling according to an embodiment of the present disclosure.

For a better understanding of the disclosure, and to show how embodiments of the same may be carried into effect, reference will now be made, by way of example only, to the accompanying diagrammatic drawings in which:

FIG. 1 illustrates a flowchart of a UE method for CIoT data handling according to an embodiment of the present disclosure; and FIG. 2 illustrates a flowchart of a network entity method for CIoT data handling according to an embodiment of the present disclosure.

A first embodiment of the disclosure defines a new AMF behaviour for handing CIoT user data when there is no routing information.

To address the problem that has been identified earlier, there are multiple possible options.

Note that the details set out below are for the case of the AMF receiving a CPSR message which contains CIoT user data but the AMF does not have PDU session routing context (or information) that is associated with the PDU session ID, and hence the AMF cannot forward the data to the SMF. It should be noted that this may also mean that the PDU session ID that is included in the CPSR message is considered to be a session that is not active (or that is for a session that is inactive or has been released by the network).

In one embodiment, the AMF sends the DL NAS TRANSPORT message which includes the CIoT user data which was not forwarded (and hence being sent back to the UE) before sending the service accept message.

In such embodiment, when the AMF receives the CIoT user data in a CPSR message and the AMF does not have PDU session routing context, the AMF may send the CIoT user data back to the UE in the DL NAS TRANSPORT message as already specified in 3GPP TS 24.501. However, what is important and hence set out herein is that the DL NAS TRANSPORT message may be sent before the AMF sends the service accept message to the UE. This ensures that the UE is able to conclude that the CIoT user data was not successfully sent even when the service accept message is subsequently received.

Furthermore, the AMF may send the service accept message and include the PDU session status IE in the message. Moreover, the AMF may set the PDU session ID, which was received in the CPSR message and for which there is no PDU session routing context, such that the corresponding bit position in the IE indicates that the PDU session is inactive in the network. For example, the (PSI—PDU Session Identity) bit position corresponding to the PDU session ID (which the AMF received in the CPSR message and for which there is no PDU session routing context) may be set to the value 0 by the AMF i.e., "the 5GSM state of the corresponding PDU session is PDU SESSION INACTIVE" (see 3GPP TS 24.501.

During a service request procedure for which the UE has sent the CPSR message with CIoT user data, if the UE receives the DL NAS TRANSPORT message with a CIoT user data (which was not forwarded) and the 5GMM cause value #90 "payload was not forwarded," the UE may inform the upper layers that the CIoT user data was not successfully transmitted.

Optionally, the UE behaves as provided if the DL NAS TRANSPORT message is received before the service accept message.

During a service request procedure for which the UE has sent the CPSR message with CIoT user data, if the UE receives the service accept message with the PDU session status IE such that the PDU session ID, which the UE had included in the CPSR message, is now set to indicate or now indicates (in the PDU session status IE) that the PDU session is inactive, then the UE may consider that the CIoT user data which was sent in the CPSR message has not been successfully transmitted or delivered or transferred by the network. The UE may inform the upper layers that the CIoT user data was not successfully transferred. The UE may also send the PDU session ID to the upper layers to specify which PDU session ID is being referred to.

Note that the UE sending the provided indication to the upper layer may mean any of the following alternatives with respect to the provided indication above (optionally with the PDU session ID in question):

The UE NAS 5GMM entity informs the 5GSM entity, which in turn may inform the application layers;
The UE NAS 5GSM entity informs the application layer; and
The UE NAS 5GMM entity informs the application layer.

In one embodiment, the AMF sends the 5GMM STATUS message to the UE.

In such embodiment, when the identified scenario, as explained earlier occurs, the AMF may send the 5GMM STATUS message to the UE. The AMF may set the 5GMM cause value to any existing value (e.g., #90) or to a new value. Optionally the AMF may include the PDU session ID as a new field in the 5GMM STATUS message. It is preferable that the AMF sends the 5GMM STATUS message to the UE before sending the service accept message.

During a service request procedure for which the UE has sent the CPSR message with CIoT user data, if the UE receives the 5GMM STATUS message (optionally with the PDU session ID, optionally where this message may be received before or after receiving a service accept message) then the UE may consider that the CIoT user data which was sent in the CPSR message has not been successfully transmitted or delivered or transferred by the network. The UE may inform the upper layers that the CIoT user data was not successfully transferred.

The UE may also send the PDU session ID, if received, to the upper layers to specify which PDU session ID is being referred to. In this case, the UE may also locally deactivate the PDU session that is identified by the PDU session ID, where this identification is either explicitly received by the UE or determined by the UE to be the PDU session ID that was sent by the UE in a previous NAS message such as a CPSR message or the UL NAS TRANSPORT message. Note that this local deactivation of the session may also be performed by the UE for any of the options set out herein. Moreover, the UE can take this action regardless of the content that was sent by the UE e.g., the content may be CIoT user data or any 5GSM message. The UE may behave as described e.g., whenever the cause value #90 is received in any NAS message.

Note that the UE sending the provided indication to the upper layer may mean any of the following alternatives with respect to the provided indication above (optionally with the PDU session ID in question):

The UE NAS 5GMM entity informs the 5GSM entity, which in turn may inform the application layers;
The UE NAS 5GSM entity informs the application layer; and
The UE NAS 5GMM entity informs the application layer.

In one embodiment, the AMF sends the service accept message to the UE and includes an indication that the CIoT user data was not forwarded.

In this option, when the identified scenario as set out earlier occurs, the AMF sends the service accept message to the UE and also includes an indication that the CIoT user data (which was received in the CPSR message) was not successfully forwarded or transferred. The AMF may include a new indication or may include the 5GMM cause value and set the indication or value to #90 or any other new value which may indicate the lack of success in transferring of the CIoT user data. The service accept message may also include a PDU session ID to refer to the session for which the CIoT user data was not successfully transferred. The service accept may also include the CIoT user data which was not forwarded by the AMF.

During a service request procedure for which the UE has sent the CPSR message with CIoT user data, if the UE receives the service accept message (optionally with the PDU session ID) with an indication that the CIoT user data was not successfully transferred, then the UE may inform the upper layers that the CIoT user data was not successfully transferred. The UE may also send the PDU session ID, if received, to the upper layers to specify which PDU session ID is being referred to. The UE may also send the CIoT user data transfer (which was not forwarded by the AMF), if received, to the upper layers.

Note that the UE sending the indication to the upper layer may mean any of the following alternatives with respect to the provided indication above (optionally with the PDU session ID in question):

The UE NAS 5GMM entity informs the 5GSM entity, which in turn may inform the application layers;
The UE NAS 5GSM entity informs the application layer; and
The UE NAS 5GMM entity informs the application layer.

In one embodiment, the AMF sends the service reject message to the UE and includes an indication that the CIoT user data was not forwarded.

In this option, when the identified scenario as set out earlier occurs, the AMF sends the service reject message to the UE and also includes an indication that the CIoT user data (which was received in the CPSR message) was not successfully forwarded or transferred. The AMF may include a new indication or may include the 5GMM cause value and set the indication ore value to #90 or any other new value which may indicate the lack of success in transferring of the CIoT user data. The service reject message may also include a PDU session ID to refer to the session for which the CIoT user data was not successfully transferred. The service accept may also include the CIoT user data which was not forwarded by the AMF.

During a service request procedure for which the UE has sent the CPSR message with CIoT user data, if the UE receives the service reject message (optionally with the PDU session ID) with an indication that the CIoT user data was not successfully transferred (e.g., in the forms of a new or existing 5GMM cause value), then the UE may inform the upper layers that the CIoT user data was not successfully transferred. The UE may also send the PDU session ID, if received, to the upper layers to specify which PDU session ID is being referred to. The UE may also send the CIoT user data transfer (which was not forwarded by the AMF), if received, to the upper layers. Note that the UE remains in (or enters) 5GMM-REGISTERED state.

Note that the UE sending the indication to the upper layer may mean any of the following alternatives with respect to the indication above (optionally with the PDU session ID in question):
The UE NAS 5GMM entity informs the 5GSM entity, which in turn may inform the application layers;
The UE NAS 5GSM entity informs the application layer; and
The UE NAS 5GMM entity informs the application layer.

For any of the options above, during the service request procedure for which the UE sent a CPSR message including a CIoT user data, if the UE receives a service accept or service reject message with the PDU session status IE such that the PDU session ID which was sent in the CPSR message (with the CIoT user data) is set such that the message indicates that the PDU session is inactive in the network, then the UE may consider (or determine or conclude) that the CIoT user data was not successfully sent or transmitted. The UE may inform the upper layers about this failure in CIoT user data transmission and optionally also provide the PDU session ID in question, where this ID may be received in the service accept message or derived from the CPSR message which was sent earlier.

In one embodiment, the AMF sends the service accept message to the UE and includes the PDU session status IE and indicates that the PDU session corresponding to the PDU session ID (received in the CPSR message) is inactive.

In this option, when the identified scenario as set out earlier occurs, the AMF may include the PDU session status IE in the service accept message. Additionally, the AMF may set the bit (i.e., the PSI bit) corresponding to the PDU session identity (for which there is no PDU session routing context) to indicate that the PDU session is inactive. In other words, when sending the SERVICE ACCEPT message the AMF may include the PDU session status IE and set the bit corresponding to the received PDU session ID (e.g., from the CPSR message) to indicate that the PDU session is inactive.

During a service request procedure for which the UE has sent the CPSR message with CIoT user data, if the UE receives the service accept message with a PDU session status IE such that a PDU session (identified by a PDU session ID) is indicated to be inactive in the network (e.g., in the AMF) and the PDU session ID is the same as the PDU session ID that the UE had used in a CPSR message which contained CIoT user data, then the UE determines that the CIoT user data was not successfully sent. The UE informs the 5GSM entity that the CIoT user data was not successfully sent for the PDU session identity. Note that the behaviour above may be performed optionally after the UE has locally released the PDU session which has been identified to be inactive at the network (via the PDU session status IE).

Optionally, the UE behaves as described above if the UE has not received (optionally before receiving the service accept message) a DL NAS TRANSPORT message with the 5GMM cause value #90 and optionally a CIoT user data which was not forwarded. Note that when the UE sends the PDU session ID to the upper layers (as described above), the UE may determine the PDU session ID as the PDU session ID that was sent by the UE in the NAS message (which contained the CIoT user data) i.e., either the CPSR message or the UL NAS TRANSPORT message. Note that this can apply for any of the embodiments herein described.

Note that the UE sending the indication to the upper layer may mean any of the following alternatives with respect to the indication above (optionally with the PDU session ID in question):
The UE NAS 5GMM entity informs the 5GSM entity, which in turn may inform the application layers;
The UE NAS 5GSM entity informs the application layer; and
The UE NAS 5GMM entity informs the application layer.

The following details apply for the UE regardless of the particular options selected above.

If the UE receives any NAS message (e.g., DL NAS TRANSPORT message, service accept message, service reject message, etc.) which includes the 5GMM cause value #90 "payload was not forwarded" and optionally a PDU session identity, the UE may locally deactivate (or release) the PDU session which is identified by the PDU session identity that has been received. Note that the 5GMM entity or the 5GSM entity may perform the actual local release of the PDU session. In the case of the 5GSM entity, the 5GSM can perform this behaviour if the 5GSM entity receives the cause value #90 from the 5GMM entity optionally along with (at least a) PDU session identity. Note that the steps above may be applied optionally if the content of the message which was not forwarded is a 5GSM message or a CIoT user data, however the main condition is that the cause value may be associated with a PDU session identity.

For any of the options 1-5 above, if the AMF receives CIoT user data such that the PDU session ID (for which the data is being sent) is inactive in the network, the AMF may discard the contents of the message or the AMF may discard the CIoT user data contents. Note that this applies to any NAS message which carries CIoT user data such as the CPSR message or the UL NAS TRANSPORT message. The following can be an example of AMF behavior when the NAS message received is a CPSR message.

If a CONTROL PLANE SERVICE REQUEST message (or UL NAS TRANSPORT message) is received with CIoT user data for a PDU session that is not active in the network, the AMF may discard the CIoT user data. The AMF may send the SERVICE ACCEPT message and indicate that this PDU session ID is inactive using the PDU session status IE. Alternatively (optionally for the case of AMF receiving an UL NAS TRANSPORT), the AMF may send a DL NAS TRANSPORT or a 5GMM STATUS message. The AMF may take the same actions for any option or for any NAS message that is received. E.g., AMF may apply similar behaviour for the case when service accept is received.

Alternatively, the AMF may send a service reject message with a Back Off, BO, timer that may be any of the BO timer for DNN, S-NSSAI, or DNN and S-NSSAI congestion. E.g., the timer sent may be related to T3396, T3584, or T3585. Alternatively, the timer may be related to 5GMM congestion such as T3446 or congestion for CIoT data over control plane e.g., T3448 or a service gap timer T3447, or any BO timer.

Note that this can be applied for any of the options 1-5 herein.

All of the steps and actions set out herein can be applied in any combination or order. For example, steps or actions from different options set out herein can be combined and applied in any order.

Moreover, all the AMF behaviour that has been described herein can also apply to the MME as new MME behaviour and vice versa. For example, for all the detailed descriptions of behaviour herein, the AMF behaviour can be applicable to MME behaviour and vice versa. In doing so, all parameters or messages in specific systems can be either the same or similar. For example, a PDU session ID in N1 mode (5GS) may be considered to be EPS bearer ID in S1 mode (EPS), and vice versa. The skilled person will readily appreciate the correlation and similarities between 5G and EPS and make any necessary adaptations.

Note that for the options above (in any of the options or combination of options), the AMF behaviour (or MME behaviour) may be the same regardless of the message which carries the CIoT user data. For example, the AMF may receive either CPSR message or UL NAS TRANSPORT message with CIoT user data and for which the PDU session ID is either invalid or has no routing context. The AMF behaviour may be any combination of the options herein. Similarly, the UE behaviour set out for any of the options may be applied to any NAS message that is received and hence is not tied to a specific NAS message that is received from the AMF. All steps can be applied in any order or combination for any NAS message that is received at the UE and/or the network, and optionally for a PDU session ID that is either invalid (or inactive or not active) or for which there is no routing context.

For any of the options above or herein, or for any other use case not necessarily related to CIoT user data, if the AMF receives a NAS message (and optionally other data contents such as but not limited to CIoT user data) for a PDU session for which the PDU session ID is not active (or is inactive), then the AMF may also locally deactivate the PDU session context (i.e., set the context of the PDU session associated with the PDU session ID to be inactive). The AMF may also inform the SMF to release or deactivate the PDU session. Hence this applies when the NAS message received by the AMF contains a 5GSM message or any other content that is destined for an SMF. Embodiments can apply for any NAS message that is received or whenever the AMF determines that a PDU session has no routing context.

Note that all the details set out for the UE may be applied by the 5GMM entity or the 5GSM entity or both or any other entity in the UE or the entire NAS entity. All details apply for any content that the UE/AMF sends/receives and is not restricted to CIoT user data but can also include e.g., 5GSM NAS messages, or any combination of CIoT user data and 5GSM NAS messages.

For all the details above, the AMF can also include the PDU session status IE (as described above) in the DL NAS TRANSPORT message also. The UE behaviour may be the same when this message is received with PDU session status IE. In other words, regardless of the type of message received (e.g., service accept or DL NAS TRANSPORT message), the UE may process the PDU session status IE in the same manner as set out herein or as described in 3GPP TS 24.501.

In relation to the problem of a lack of handling by the MME of CIoT user data for which there is an invalid EPS bearer identity, the following embodiment applies.

If the MME receives the ESM DATA TRANSPORT message (either as a standalone ESM message or included in the CPSR message) and EPS bearer identity which is included in the ESM DATA TRANSPORT message indicates an EPS bearer identity value (or is for an EPS bearer) which does not belong to any already activated EPS bearer context in the MME, then the MME may behave as follows in any order or combination:

The MME may discard the CIoT user data or the contents of the ESM DATA TRANSPORT message;

The MME may abort the service request procedure or abort the transport of user data via the control plane procedure (or the ESM data transport procedure); and The MME may send the ESM STATUS message to the UE and include the ESM cause value #43 "invalid EPS bearer identity." Note that the MME may still send a service accept message to the UE.

Note that an EPS bearer identity value which does not belong to any already activated EPS bearer context can mean that the state of the EPS bearer (which is associated with the EPS bearer identity in question) is BEARER CONTEXT INACTIVE.

During a service request procedure for which the UE sends (or had sent) a CPSR message which included the ESM DATA TRANSPORT message or which included CIoT user data, if the UE receives the ESM STATUS message, optionally with cause value #43, then the UE may stop the associated timer i.e., T3417. Optionally, the UE considers that the CIoT user data was not successfully transmitted and may also optionally provide an indication to the upper layers that the data was not successfully transmitted.

Note that the UE sending the provided indication to the upper layer may mean any of the following alternatives with respect to the provided indication above (optionally with the EPS bearer ID in question e.g., the EPS bearer ID that the UE had included in the ESM DATA TRANSPORT message):

The UE NAS EMM entity informs the ESM entity, which in turn may inform the application layers;

The UE NAS ESM entity informs the application layer; and

The UE NAS EMM entity informs the application layer.

Note that the details above are also applicable for the case when the UE sends the ESM DATA TRANSPORT message in connected mode i.e., the ESM message is not sent as part of the CPSR message. As such, the same may apply. For example, the following MME behaviour is provided for, regardless of whether the ESM DATA TRANSPORT message is sent in the CPSR message or not.

If the EPS bearer identity provided in the ESM DATA TRANSPORT message (which is received by the MME) indicates an EPS bearer identity value which does not belong to any already activated EPS bearer context, the MME may abort the transport of user data via the control plane procedure. The MME may then send the ESM STATUS message with ESM cause #43 "invalid EPS bearer identity."

If the EPS bearer identity provided in the ESM DATA TRANSPORT message (which is received by the MME) indicates an EPS bearer identity value which does not belong to any already activated EPS bearer context, the MME may discard the contents of the ESM DATA TRANSPORT message. The MME may send the ESM STATUS message with ESM cause #43 "invalid EPS bearer identity."

A similar solution is also provided for the UE which may receive the ESM DATA TRANSPORT message with an EPS bearer identity that is invalid (or that corresponds with an EPS bearer context that is not active in the UE).

If the EPS bearer identity provided in the ESM DATA TRANSPORT message (which is received by the UE) indicates an EPS bearer identity value which does not belong to any already activated EPS bearer context, the UE may abort the transport of user data via the control plane procedure. The UE may then send the ESM STATUS message with ESM cause #43 "invalid EPS bearer identity."

If the EPS bearer identity provided in the ESM DATA TRANSPORT message (which is received by the UE) indicates an EPS bearer identity value which does not belong to any already activated EPS bearer context, the UE may discard the contents of the ESM DATA TRANSPORT message. The UE may then send the ESM STATUS message with ESM cause #43 "invalid EPS bearer identity."

Note that for every detailed procedure or set of steps described herein, the steps or actions may apply in any order or combination. The proposals also apply in S1 mode or N1 mode.

For completeness, FIG. 1 shows a flowchart connected with a first embodiment from the UE perspective. At Step S101, the UE sends to the telecommunication network a CPSR message with CIoT user data, associated with a PDU session.

At step S102, the UE receives from the telecommunication network a SERVICE ACCEPT message, indicating that the PDU session is inactive in the network.

At step S103, the UE verifies if the PDU session has an identity the same as an identity of the PDU session included in the CPSR message with CIoT user data and, if so then the UE determines that the CIoT user data was not successfully sent to the telecommunication network.

FIG. 2 shows a flowchart connected with a second embodiment from the network perspective. At Step S201, the telecommunication network receives from the UE a CPSR message with CIoT user data associated with a PDU session.

At step S202, the telecommunication network discards the CIoT data.

At step S203, the telecommunication network sends to the UE a SERVICE ACCEPT message, indicating that the PDU session is inactive in the network.

Figure 3:
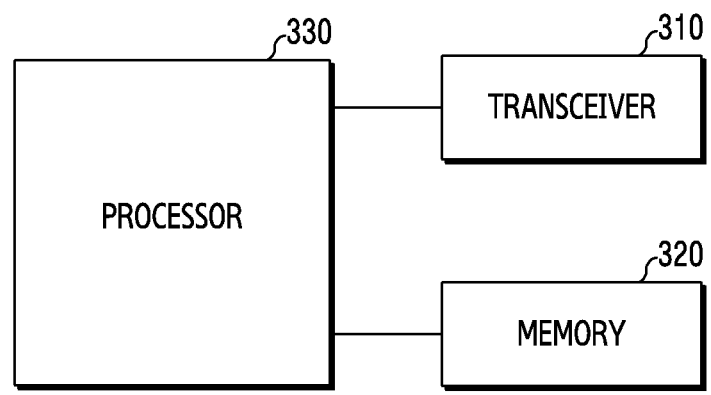
FIG. 3 illustrates an internal configuration of a base station according to an embodiment of the present disclosure.

FIG. 3 illustrates an internal configuration of a base station according to an embodiment of the present disclosure.

As shown in FIG. 3, the base station according to an embodiment may include a transceiver 34, a memory 320, and a processor 330. The transceiver 34, the memory 320, and the processor 330 of the base station may operate according to a communication method of the base station described above. However, the components of the base station are not limited thereto. For example, the base station may include more or fewer components than those described above. In addition, the processor 330, the transceiver 34, and the memory 320 may be implemented as a single chip. Also, the processor 330 may include at least one processor.

The transceiver 34 collectively refers to a base station receiver and a base station transmitter and may transmit/receive a signal to/from a terminal. The signal transmitted or received to or from the terminal may include control information and data. The transceiver 34 may include a RF transmitter for up-converting and amplifying a frequency of a transmitted signal, and a RF receiver for amplifying low-noise and down-converting a frequency of a received signal. However, this is only an example of the transceiver 34 and components of the transceiver 34 are not limited to the RF transmitter and the RF receiver.

Also, the transceiver 34 may receive and output, to the processor 330, a signal through a wireless channel, and transmit a signal output from the processor 330 through the wireless channel.

The memory 320 may store a program and data required for operations of the base station. Also, the memory 320 may store control information or data included in a signal obtained by the base station. The memory 320 may be a storage medium, such as read-only memory (ROM), random access memory (RAM), a hard disk, a CD-ROM, and a DVD, or a combination of storage media.

The processor 330 may control a series of processes such that the base station operates as described above. For example, the transceiver 34 may receive a data signal including a control signal transmitted by the terminal, and the processor 330 may determine a result of receiving the control signal and the data signal transmitted by the terminal. The processor may be referred to a controller.

Figure 4:
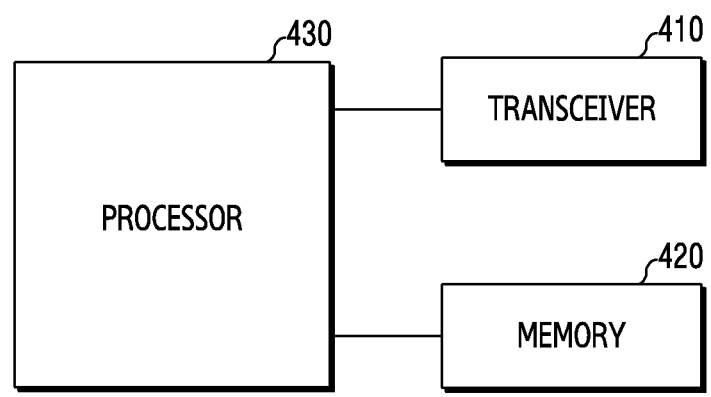
FIG. 4 illustrates an internal structure of a user equipment according to an embodiment of the present disclosure.

FIG. 4 illustrates an internal structure of a terminal according to an embodiment of the present disclosure.

As shown in FIG. 4, the terminal of the present disclosure may include a transceiver 44, a memory 44, and a processor 430. The transceiver 44, the memory 44, and the processor 430 of the terminal may operate according to a communication method of the terminal described above. However, the components of the terminal are not limited thereto. For example, the terminal may include more or fewer components than those described above. In addition, the processor 430, the transceiver 44, and the memory 44 may be implemented as a single chip. Also, the processor 430 may include at least one processor.

The transceiver 44 collectively refers to a terminal receiver and a terminal transmitter and may transmit/receive a signal to/from a base station. The signal transmitted or received to or from the base station may include control information and data. In this regard, the transceiver 44 may include a RF transmitter for up-converting and amplifying a frequency of a transmitted signal, and a RF receiver for amplifying low-noise and down-converting a frequency of a received signal. However, this is only an example of the transceiver 44 and components of the transceiver 44 are not limited to the RF transmitter and the RF receiver.

Also, the transceiver 44 may receive and output, to the processor 430, a signal through a wireless channel, and transmit a signal output from the processor 430 through the wireless channel.

The memory 44 may store a program and data required for operations of the terminal. Also, the memory 44 may store control information or data included in a signal obtained by the terminal. The memory 44 may be a storage medium, such as ROM, RAM, a hard disk, a CD-ROM, and a DVD, or a combination of storage media.

The processor 430 may control a series of processes such that the terminal operates as described above. For example, the transceiver 44 may receive a data signal including a control signal, and the processor 430 may determine a result of receiving the data signal. The processor may be referred to a controller.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

At least some of the example embodiments described herein may be constructed, partially or wholly, using dedicated special-purpose hardware. Terms such as "component," "module," or "unit" used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   transmitting, to an access and mobility management function (AMF) entity, a control plane service request (CPSR) message including cellular Internet of Things (CIoT) user data for a first protocol data unit (PDU) session;
   receiving, from the AMF entity, a service accept message indicating that the first PDU session is inactive in a network;
   identifying whether a second PDU session has an identity value that is a same as an identity value of the first PDU session included in the CPSR message, wherein the second PDU session is one of at least one locally released PDU session based on the service accept message; and
   determining, based on a determination that the second PDU session has the identity value that is the same as the identity value of the first PDU session, that the CIoT user data is not successfully sent to the AMF entity.

2. The method of claim 1, wherein the service accept message includes a PDU session status information element (IE) that indicates that the first PDU session is inactive in the network.

3. The method of claim 1, wherein the CIoT user data for the first PDU session is discarded at the AMF entity.

4. A method performed by an access and mobility management function (AMF) entity in a wireless communication system, the method comprising:
   receiving, from a user equipment (UE), a control plane service request (CPSR) message including cellular Internet of Things (CIoT) user data for a first protocol data unit (PDU) session;
   discarding the CIoT user data in case that the first PDU session is inactive in a network; and
   transmitting, to the UE, a service accept message indicating that the first PDU session is inactive in the network,
   wherein a second PDU session is locally released based on the service accept message, and
   wherein a transmission of the CIoT user data is not successfully performed based on the second PDU session having an identity value that is same as an identity value of the first PDU session associated with the CPSR message.

5. The method of claim 4, wherein the service accept message includes a PDU session status information element (IE) that indicates that the first PDU session is inactive in the network.

6. A user equipment (UE) in a wireless communication system, the UE comprising:
   a transceiver; and
   at least one processor coupled with the transceiver and configured to:
      transmit, to an access and mobility management function (AMF) entity, a control plane service request (CPSR) message including cellular Internet of Things (CIoT) user data for a first protocol data unit (PDU) session, and
      receive, from the AMF entity, a service accept message indicating that the first PDU session is inactive in a network; and
      identify whether a second PDU session has an identity value that is a same as an identity value of the first PDU session included in the CPSR message, wherein the second PDU session is one of at least one locally released PDU session based on the service accept message, and
      determine, based on a determination that the second PDU session has the identity value that is the same as the identity value of the first PDU session, that the CIoT user data is not successfully sent to the AMF entity.

7. The UE of claim 6, wherein the service accept message includes a PDU session status information element (IE) that indicates that the first PDU session in in the network.

8. The UE of claim 6, wherein the CIoT user data for the first PDU session is discarded at the AMF entity.

9. An access and mobility management function (AMF) entity in a wireless communication system, the AMF entity comprising:
   a transceiver; and
   at least one processor coupled with the transceiver and configured to:
      receive, from a user equipment (UE), a control plane service request (CPSR) message including cellular Internet of Things (CIoT) user data for a first protocol data unit (PDU) session,
      discard the CIoT user data in case that the first PDU session is inactive in a network, and
      transmit, to the UE, a service accept message indicating that the first PDU session is inactive in the network,
      wherein a second PDU session is locally released based on the service accept message, and
      wherein a transmission of the CIoT user data is not successfully performed based on the second PDU session having an identity value that is same as an identity value of the first PDU session associated with the CPSR message.

10. The AMF entity of claim 9, wherein the service accept message includes a PDU session status information element (IE) that indicates that the first PDU session is inactive in the network.

* * * * *